Figure 9:
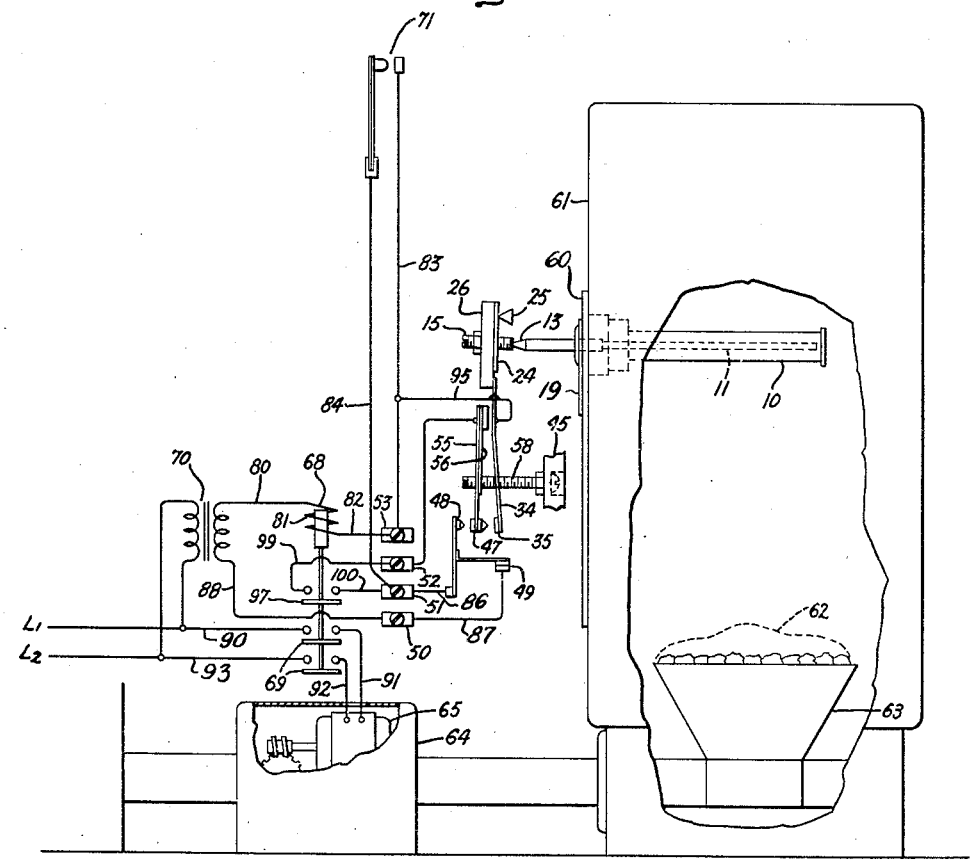

Feb. 14, 1950     J. EATON     2,497,663
SELECTIVE CONDITION CONTROL
Filed Aug. 15, 1946     2 Sheets-Sheet 1
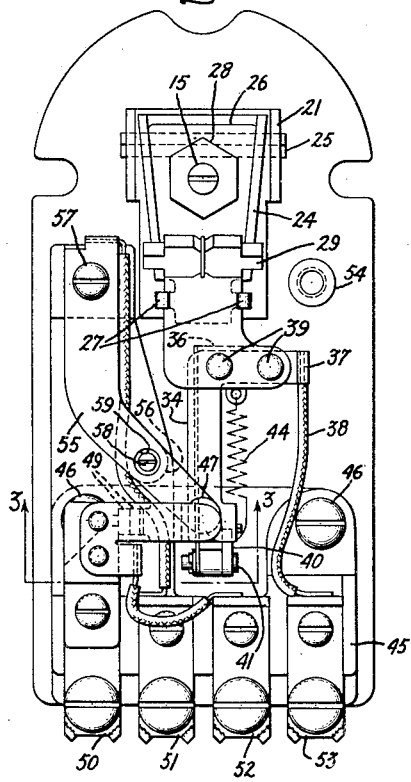
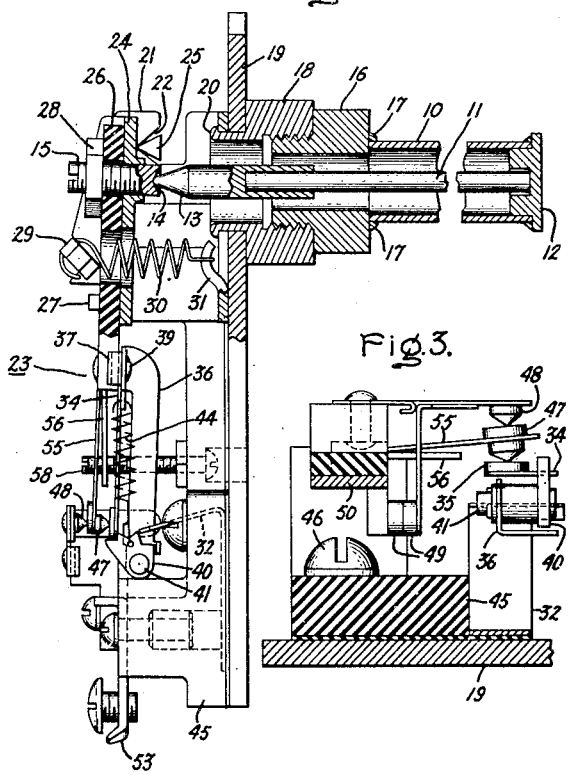
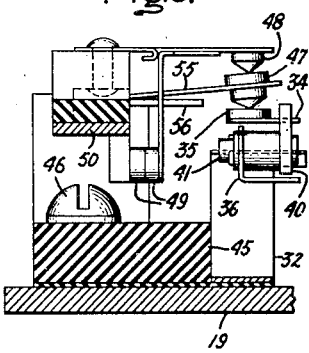
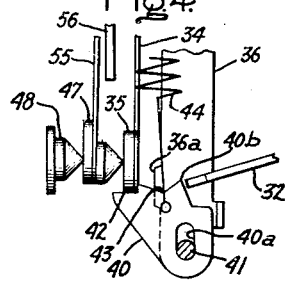
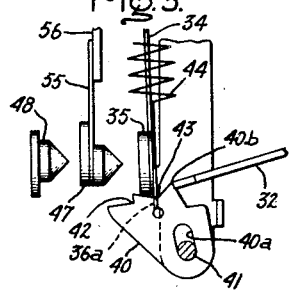
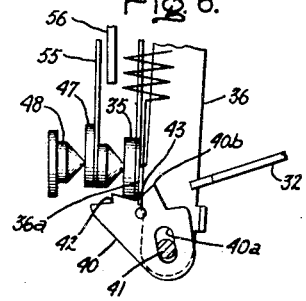
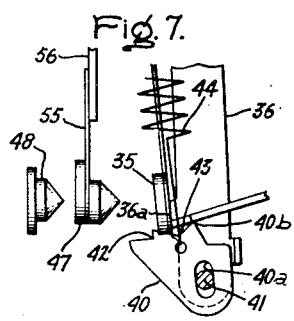
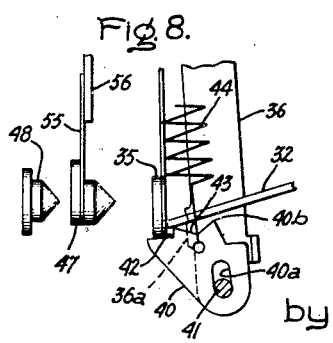
Inventor:
John Eaton,
by Edwin L. Rich
His Attorney.

Feb. 14, 1950                    J. EATON                    2,497,663
                        SELECTIVE CONDITION CONTROL
Filed Aug. 15, 1946                                    2 Sheets-Sheet 2

Inventor:
John Eaton,
by Edwin L. Rich
His Attorney.

Patented Feb. 14, 1950

2,497,663

UNITED STATES PATENT OFFICE 2,497,663

SELECTIVE CONDITION CONTROL

John Eaton, Schenectady, N. Y., assignor to General Electric Company, a corporation of New York Application August 15, 1946, Serial No. 690,617

11 Claims. (Cl. 200—137)

The invention relates to selective condition control and particularly to automatic reversely variable condition responsive circuit control systems suitable for stoker hold fire control or other service where it is necessary to control differentially in accordance with automatically selected opposite variations of some widely variable condition such as temperature, pressure, speed, water level, or the like.

The principal object is to provide an improved form of automatic selective condition responsive differential control that will not only differentially control in response to relatively small variations of a condition away from and towards a predetermined value but also is capable of automatically and reversely varying or adjusting its differential control response whenever a predetermined larger variation of the condition occurs.

The improvements provided by the present invention are particularly advantages in a stoker hold fire control switch mechanism for enabling the mechanism to produce a stoker hold fire operation at an elevated temperature after a room temperature operation of the stoker.

My application Serial No. 575,133, filed January 29, 1945, discloses and claims an improved automatic differential selective control of the above character especially adapted for stoker hold fire control service and utilizing a friction slip clutch together with means for automatically adjusting the clutch in one direction and also means for automatically adjusting the clutch in the other direction to obtain the desired automatic differential selective condition responsive control. However, any friction slip clutch type of control under widely variable conditions inherently imposes a considerable friction load upon any sensitive condition responsive operating means and thus is likely to become uncertain and inaccurate whenever the amount of friction becomes variable or uncertain. Hence any friction slip clutch type of control leaves something to be desired in the way of a more certain and accurate control that will be free of the loads imposed by the slip friction of the clutch.

Thus another object is to provide an improved form of selective variable condition responsive reversible interlocking control mechanism whereby a differential control of the above indicated character may be obtained without requiring any friction slip action.

Another object is to provide an improved form of variable condition responsive adjustable differential circuit controlling switch mechanism for making the pickup circuit of an electrical control relay or the like upon variation of the condition in one direction to a desired value and breaking a holding circuit for the relay upon an opposite variation of the condition to a separately adjustable value.

Another object is to provide an improved form of automatic differential control mechanism having a relatively movable positive interlocking member for controlling the relative position of a control member that is operated by a sensitive condition responsive means in different interlocked positions together with selective stop means cooperating with the interlocking member and control member to reversely vary the interlocked relationship thereof upon different variations of the condition.

Further objects and advantages provided by the present invention will appear from the following description of the accompanying drawing in which Fig. 1 is a front view of an automatic differential selective condition responsive control device embodying the improvements of the invention in a preferred form and specially adapted for stoker hold fire control service; Fig. 2 is a side view, partly in section, of the device shown in Fig. 1, Fig. 3 is a sectional view on the line 3—3 of Fig. 1, Figs. 4, 5, 6, 7, and 8 are partial views on an enlarged scale showing the relative positions during different phases of operation of the improved adjustable differential pickup and holding circuit controlling contact elements as well as the improved differential positive interlocking mechanism with which the device of Figs. 1 and 2 is provided in accordance with the present invention; and Fig. 9 is a schematic diagram showing the system circuit connections of the automatic condition responsive control device of Figs. 1 and 2 as applied to stoker hold fire control service.

The automatic selective control device shown in Figs. 1 and 2 is provided with a sensitive condition responsive operating means consisting in the preferred form shown, of the stoker fire temperature responsive tube 10 formed of relatively thin high temperature resistant expansible metal and the relatively non-expansible rod 11, formed of quartz or the like. One end of the rod 11 is mounted in the cup 12 carried by the end of the expansible tube 10 and the other end of rod 11 is provided with a pointed extension 13 to engage centrally with the conical recess 14 formed in the end of the adjustable temperature calibrating screw 15. The expansible tube 10 is secured to a head 16 preferably by welds 17 and the head 16 is screw-threaded into the socket 18 which is fixed to the mounting plate or base 19 by riveting over the end of the collar 20 to also secure to the base 19 the bracket 21 having the spaced apart pivot bearing notches 22 for the main movable circuit controlling interlock mechanism indicated generally by the reference character 23.

The main movable circuit control mechanism 23 includes a tapered channel member 24 provided with a knife edge pivot bar 25 for mounting in the spaced apart bearing notches 22 formed in the bracket 21. A block 26 of insulating material for mounting the circuit controlling parts is carried inside the tapered channel member 24 and fixedly secured thereto by the oppositely bent-over fingers 27 extending from the channel member 24. The temperature adjusting screw 15 is threaded into the channel member 24 and is held in its adjusted position by engagement of the lock nut 28 with the insulating block 26. The channel member 24 also carries a cross pin 29 mounted in suitable notches formed therein and the pin 29 serves to anchor one end of the tension biasing spring 30 with the other end of spring 30 anchored on the hook 31. Thus the tension spring 30 exerts a biasing force tending to hold the pointed extension member 13 firmly seated in the recess 14 of the adjusting screw 15 and the knife edge pivot bar 25 firmly seated in the spaced apart notches 22 formed in the mounting bracket 21. As a result the expansion and contraction of tube 10 will be transmitted through rod 11 to oscillate the channel member 24 and all the other control parts carried thereby about the knife edge pivot axis provided by bar 25. Since this pivot axis is located closely adjacent the pointed end of extension 13, a relatively large motion amplification is obtained.

The insulating block 26 carries at its lower end both the resilient relatively movable switch arm 34 for mounting the main movable switch contact 35 and the adjacent rigid operating arm 36. Both arms are fixedly secured to the block 26 along with the terminal 37 of the flexible circuit lead 38 by means of the rivets 39. The rigid operating arm 36 carries the relatively movable overlapping interlocking pawl member 40 having a slot 40a slidably and rotatably mounted on the pin 41 extending from arm 36 and having the notches 42 and 43 (see Figs. 4 to 8) biased into different selective interlocking engagements with respect to the resilient contact arm 34 jointly by means of the stationary stop 32 and the biasing spring 44. Thus, according to the present invention, the rigid operating arm 36 and the juxtaposed and overlapping interlocking notched pawl member 40 constitute selective operating connections for the temperature responsive means, one (i. e. arm 36) for operating the movable switch contact 35 to a predetermined circuit controlling position when the temperature condition reaches a predetermined value and the other (i.e. pawl 40) for operating the contact 35 to said predetermined circuit control position before said temperature condition reaches said value. The several different circuit controlling interlocked relations of these parts shown in the enlarged views of Figs. 4–8 will be more fully described hereinafter.

An L-shaped insulating mounting block 45 is fixedly secured to the base 19 by the screws 46 so as to carry the improved adjustable differential switch contacts 47 and 48 in relatively adjustable sequential circuit making and breaking relation with the main movable switch contact 35. The cooperating normally closed stoker out fire control contacts 49 shown in Fig. 3 and the several circuit wiring connection terminals 50, 51, 52, and 53, also are mounted on block 45 so as to be electrically insulated from the base 19. As described more fully hereinafter in connection with the operation of the stoker control circuit diagram shown in Fig. 9, the sequentially engaging relay pickup contact 47 and holding contact 48 cooperate with the main movable switch contact 35 to provide an improved form of adjustable differential relay pickup and drop-out circuit control in accordance with the present invention. For this purpose the double faced intermediate holding circuit control contact 47 is carried at the end of a resilient contact arm 55 which is biased into engagement with the adjustable stop member 56. The biased resilient contact arm 55 and the adjustable stop member 56 both are secured to the insulating block 45 by means of the mounting screw 57. Thus the range of resilient movement for the intermediate holding contact 48 towards and away from the pickup contact 47 is controlled by the relative position of stop 56 and this can be varied by adjusting screw 58 which for convenient access extends through a suitable opening 59 formed in the resilient holding contact arm 55. The removable cover for enclosing the operating parts of the switch is not shown but is arranged to be secured in place by means of the threaded bushing 54.

Operation

The operation of the improved selective differential condition responsive control device shown in Figs. 1 and 2 may be better understood by reference to Fig. 9 which shows a circuit control system and arrangement suitable for application of the device to stoker hold fire control service. As schematically shown in Fig. 9 the temperature sensitive tube 10 extends through the door 60 of a stoker furnace 61 to be responsive to the fire 62 in the stoker tuyère 63 which is supplied with coal and combustion air from a conventional stoker mechanism 64 that is operated whenever the driving motor 65 is energized. Motor 65 is energized from a suitable electric supply source $L_1$, $L_2$ under the control of the electroresponsive relay 66 having the normal open contacts 69 connected in the motor energizing circuit. Relay 68 is energized from the low voltage secondary of transformer 70 under the control of either the room thermostat 71 or the contacts 35, 47 and 48 operated by the stoker fire responsive element 10.

The room thermostat 71 operates the stoker mechanism 64 whenever required to maintain the desired room temperature and the stoker fire responsive control 10 operates to maintain the stoker fire alive, particularly during periods of mild weather when there is rather infrequent operation of the stoker under the control of the room thermostat 71. The improved form of stoker hold fire control of the present invention is particularly advantageous for stokers burning coal of a character such that the stoker fire may become extinguished in case the stoker mechanism 64 is not operated frequently enough to maintain a required minimum temperature or remains inactive for any extended period even though the temperature is above the required minimum. For example, it has been found that with some bituminous coals the fire is likely to go out following a room heating operation of the stoker under the control of the room thermostat during the rather extended period required for the furnace 61 and the fire tuyère to cool down to the normal hold fire temperature range within which the ordinary and conventional forms of stoker temperature responsive hold fire controls begin to operate. The improved stoker hold fire control of the present invention avoids this difficulty by automatically providing after each house heating operation of the stoker a temporary hold fire operation at an elevated or intermediate temperature range substantially above that obtained during the normal hold fire operation. As soon as the temporary elevated temperature range hold fire operation is completed, then the automatic stoker hold fire control of the present invention automatically readjusts itself so as to effect repeated normal hold fire operations as required to maintain the fire alive until a subsequent house heating stoker operation is produced under the control of the room thermostat.

The house heating stoker operation is produced whenever the room thermostat 71 closes its contacts. The closure of the contacts of the room thermostat 71 completes a circuit extending from the secondary of transformer 70 through conductor 80, energizing winding 81 of relay 68, conductors 82, 83, the contacts of room thermostat 71, conductor 84, wiring terminal 51, conductor 86, the normally closed out-fire control contacts 49 of the stoker hold fire device conductor 87, terminal 50, and conductor 88 to the transformer secondary. The resulting energization of relay 68 causes the relay to close its normally open contacts 69 and thereby energize the stoker driving motor 65 from the supply source L₁, L₂ through conductors 90, 91, 92 and 93. The resulting stoker house heating operation will supply coal and air to increase the temperature of the stoker fire 62, tuyère 63 and adjacent parts of the furnace 61 to a relatively high value in order to produce the heating effect necessary to satisfy the demand for heat by the room thermostat 71.

When the room heating demand is satisfied, the room thermostat 71 opens its contacts to deenergize relay 68 and thereby stop further house heating operation of the stoker mechanism 64. As previously indicated, the stoker fire is likely to go out during the rather extended period following a room heating stoker operation while the furnace parts are cooling to the normal hold fire temperature range unless a transitory stoker hold fire operation is produced at an elevated temperature above the normal hold fire temperature.

Fig. 4 shows the relative positions of the cooperating parts of the stoker hold fire contact mechanism and interlocking mechanism in producing a transitory elevated temperature hold fire operation. To accomplish this, the main movable switch contact 35 is interlocked as shown in Fig. 4 with notch 42 of the interlocking clutch member 40 and thus maintained spaced away from the stop shoulder 36a of the actuating arm 36 so as to engage with the resilient holding circuit contact 47 and move this contact against its resilient bias into engagement with the pickup circuit control contact 48 with the tube 10 at a temperature substantially above the normal hold fire temperature range.

Upon such engagement of the three contacts 35, 47 and 48 as shown in Fig. 4, a pickup circuit for relay 68 is established extending from transformer 70 through conductor 80, winding 81, conductor 82, wiring terminal 53, conductor 95, resilient switch arm 34, main movable contact 35, intermediate holding contact 47, the pickup contact 48 and thence through the normally closed outfire control contacts 49, conductor 87, terminal 50, conductor 88 to the transformer secondary. Thereupon relay 68 responds to close contact 69 and initiates the elevated temperature transitory hold fire operation. The tube 10 will respond to the resulting increase in the stoker fire temperature produced by the elevated stoker hold fire operation and expand so as to move the actuating arm 36 to the right from its position shown in Fig. 4 and thereby carry main contact 35 together with the resilient holding contact 47 away from the pickup contact 48. Relay 68 remains energized, however, since a holding circuit was established by relay auxiliary contact 97 when the relay was initially energized. The relay holding circuit provides a bypass between holding contacts 47 and pickup contact 48 through conductors 98, terminal 52, conductor 99, relay auxiliary contact 97, conductors 100, conductor 85, terminal 51. Thus, even though contacts 47 and 48 are separated, still the energization of relay winding 81 is maintained through the holding circuit.

When actuating arm 36 moves further to the right due to the continued increase in temperature produced by the elevated stoker hold fire operation, the tip 40b of interlocking clutch member 40 is brought into engagement with the stationary stop 32. As a result further movement of actuating arm 36 to the right will tilt or rotate the interlocking member 40 counterclockwise about the pin 41 so as to disengage the main contact 35 from the notch 42 as indicated in Fig. 5. Thereupon contact 35 will be snapped into abutting engagement with shoulder 36a due to the spring bias provided by the resilient arm 34. At the same time the resilient holding contact 47 is released and engages with the adjustable stop 56 in accordance with its bias. The resulting separation of contact 35 from contact 47 will interrupt the holding circuit of relay 68 and stop operation of the stoker mechanism.

After the temporary elevated temperature stoker hold fire operation is completed as just described, the furnace parts will again begin to cool down. This will result in movement of the actuating arm 36 to the left so as again to carry the main contact 35 towards the cooperating holding contact 47. As the furnace temperature thus decreases main contact 35 will again engage holding contact 47 and both contacts will then move together to again engage with the pickup contact 48. However, due to the fact that main contact 35 now rests upon shoulder 36a of arm 36, the engagement of all three contacts 35, 47 and 48 will occur when the normal hold fire temperature is reached as shown in Fig. 6. Thus again relay 68 will be energized to restart the stoker operation within the normal hold fire temperature range. As tube 10 responds to the increasing intensity of the stoker fire, arm 36 again will be moved to the right and thus carry both main contact 35 and hold contact 47 away from the pickup contact 48. However, relay 68 will remain energized through the holding circuit previously described until holding contact arm 55 again engages with the adjustable stop 56 at the upper limit of the normal hold fire temperature range. Thereupon any further movement of arm 36 to the right will carry contact 35 out of engagement with the holding contact 47 to open the relay holding circuit and thus stop the normal hold fire operation.

It will be evident that by adjusting the position of stop 56, the upper limit of the normal hold fire control range can be varied. Consequently, the differential between the pickup of relay 68 and the drop out of relay 68 can be varied by adjustment of the stop 56 so as to make the difference between the pickup temperature value and the drop out temperature value either more or less as desired. Also by adjusting the temperature adjusting screw 15 both the upper and lower limits of the normal hold fire range may be shifted one way or the other. By means of these several adjustments, the operating characteristics of the improved stoker hold fire control device can readily be varied to provide the various ranges of control required for successful hold fire operation with coal of many different grades and character.

To vary the differential between the relay pick-up temperature value and the relay drop-out temperature value for the elevated hold fire temperature range, the stationary stop 32 may be slightly bent so as to engage with the tip 40b of the interlocking member 40 when the stoker fire temperature has been increased to different temperature values. When stop 32 is bent down slightly it will lower the upper limit of the temporary hold fire temperature range and if bent up slightly will raise the upper limit. The lower limit of the elevated temperature hold fire range will depend, of course, upon the adjustment of screw 15 as well as the distance that main contact 35 is spaced away from shoulder 36a by the notch 42 formed in the interlocking member 40.

The interlocking clutch mechanism is reset to produce a stoker hold fire operation in the elevated hold fire temperature range whenever tube 10 is subjected to a relatively high temperature such as produced during a room heating stoker operation under the control of the room thermostat 71. The manner in which this resetting is accomplished is shown in Figs. 7 and 8. Thus as arm 36 is moved away from the normal hold fire temperature range and through the elevated hold fire temperature range, stop 32 again engages with the tip 40b of the interlocking member 40 and bodily slides member 40 downwardly relative to the mounting pin 41 as shown in Fig. 7. As the house heating furnace temperature further increases, arm 36 then carries contact 35 directly into engagement with stop 32, thus arresting further movement of contact 35 to the right. As arm 36 continues to move to the right due to the increased temperature produced during a room heating stoker operation, the shoulder 36a moves away from the arrested contact 35 and the interlocking member 40 is biased by spring 44 so as to reengage notch 42 with the contact 35 as indicated in Fig. 8. Consequently, when the room heating stoker operation is completed interlocking member 40 will maintain contact 35 spaced away from shoulder 36a, even though the interlocking member 40 is slightly depressed and slides somewhat relative to pin 41 as it is carried under stop 32 when arm 36 moves to the left. The biasing spring 44 maintains notch 42 in engagement with contact 35 so as to pivot the interlocking member 40 on contact 35 during the passage of the upper tip 40b of interlocking member 40 under the stationary stop 32. The slot 40a enables the interlocking member 40 to pivot about contact 35 during this resetting process wherein the interlocking member 40 is restored under the bias of the spring 44 to the position for reengaging with the stationary stop 32 as indicated in Figs. 4 and 5.

Since the biasing spring 44 is relatively weak, there is very little, if any, load imposed upon the temperature sensitive operating tube 10 during the various interlocking transitions involved in the operation of the improved interlocking control mechanism. Furthermore, the bias provided for contact 35 by the resilient arm 34 need not be very strong. As a result there is only a negligible load imposed upon the temperature sensitive operating elements at any time during the various phases of operation. Hence, the improved selective interlocking mechanism enables a more certain and accurate differential control in both the normal hold fire range and the elevated hold fire range to be obtained. Hence, when once properly adjusted, the improved interlocking selective differential hold fire control device normally will maintain the stoker fire, even though the furnace temperature varies over a very wide range. However, in case for any reason the stoker fire should become extinguished, the tube 10 will continue to cool and carry the main contact 35 together with the differential contact 47 and 48 to the left as shown in Fig. 2. As contact 48 is thus moved upwardly as shown in Fig. 3, the out-fire contacts 49 will become separated and thereby interrupt the energizing circuit of relay 68 to terminate further operation of the stoker mechanism until the fire is rekindled in the stoker. The resulting heating of tube 10 will automatically effect the reclosure of the out-fire contacts 49 and thereby restore the stoker control system to its normal operating condition.

What I claim as new and desire to secure by Letters Patent of the United States is:

1. A reversely variable condition responsive control device having in combination control means including a movable operating member having a control member movable with respect thereto, means including a movable interlocking member for controlling the relative positions of said control and operating members, condition responsive means for moving said members interlocked in different relative positions to operate said control member to a predetermined control position upon corresponding different variations of said condition in the same direction, and means including stop means disposed in the path of said interlocking member to engage therewith for reversely varying said relative positions of said members upon corresponding different variations of said condition in the opposite direction.

2. A reversely variable condition responsive control device having in combination control means including a reversely movable operating member having a relatively movable control member and a relatively movable interlocking member carried by said operating member for controlling the relative position of said control member, condition responsive means connected with said operating member for moving said members interlocked in different relations to operate said control member to a predetermined control position upon different predetermined variations of said condition, and means including stop means disposed in the paths of both said interlocking member and said control member to engage selectively therewith for reversely varying the interlocking relations of said members upon different variations of said condition.

3. A stoker control device having in combination stoker hold fire control means including a pair of jointly and relatively movable members having a predetermined biased relative position and having an interlocking member biased therebetween for varying the relative position of said members, stoker fire condition responsive means connected with one of said pair of members for moving said members interlocked in different relative positions to operate the other of said pair of members to a predetermined stoker fire control position upon different predetermined variations of said condition, and means including stop means disposed in the paths of both said interlocking member and said other member for selective engagement therewith to reversely vary the interlocked positions of said members upon different variations of said stoker fire condition.

4. A circuit control device having in combination a pair of relatively movable abutting switch members, one having a relatively movable operating member and a relatively movable interlocking member, each biased to engage with said one switch member for controlling the operation thereof, condition responsive means for moving said operating member to operate said switch members into and out of abutment with said other switch member upon different predetermined variations of said condition dependent upon the relative position of said interlocking member, and means including stop means disposed in the paths of both said interlocking member and said one switch member for selective engagement therewith to reversely vary the relative position of said interlocking member upon other predetermined variations of said condition.

5. A condition responsive control device having in combination a movable control element, operating means responsive to a variable condition and provided with connections including an interlock member having means for mounting said member for combined rotational and translational movement into two different interlocking relations with said element, one interlocking relation for operating said control element to a predetermined control position when said condition reaches a predetermined value and the other interlocking relation for operating said element to said position before said condition reaches said value, and means including a stop for selectively controlling said rotational and translational movement of said interlock member dependent upon the variation of said condition away from said value.

6. A stoker control device having in combination a movable stoker hold fire control member, operating means responsive to a variable condition of the stoker fire and provided with connections including a notched interlock member having means for mounting said member for combined rotational and translational movement to different positions, one position for operating said control member to a predetermined stoker hold fire control position when said stoker fire condition reaches a predetermined value and another position for operating said member to said predetermined position before said stoker fire condition reaches said value, and means including a stop for selectively operating said interlock member between said positions dependent upon the variation of said stoker fire condition.

7. In combination a movable control member, condition responsive means having variable connections for selectively operating said control member to a predetermined control position upon different predetermined variations of said condition, said connections including a pivoted arm having a notched interlocking pawl member carried thereby and means for mounting said interlocking pawl member for combined rotational and translational movement to different interlocking positions relative to said arm, means for biasing said interlock member into interlocking engagement with said control member in each of said positions, and stop means for engaging said interlock member selectively to effect rotational and translational movements thereof between said positions upon response of said condition responsive means to different variations of a said condition.

8. A reversely variable condition responsive control device having in combination control means including a movable control element, means for moving said element including a condition responsive mechanism having a pair of jointly and relatively movable members in variable overlapping relation, means for holding said members in two different relative positions, one position for engaging said element to move said element to a predetermined control position when said condition varies to a predetermined value and the other for variably overlapping said one member to engage said element to move said element to said control position before said condition reaches said value, and means including a stop disposed in the path of one of said relatively movable members to afford actuation of said holding means for varying the overlapping relation of said members upon predetermined variations of said condition.

9. A condition responsive control having in combination circuit control means including a pair of relatively movable contacts, condition responsive means having mechanism for operating one of said contacts toward and away from the other of said contacts responsively to different variations of a predetermined condition, said mechanism including an interlock member and means for mounting said interlock member for combined rotational and translational movement to different positions, means for biasing said interlock member into interlocking engagement with said one contact in each of said positions, stop means for engaging said interlock member selectively to effect rotational and translational movement thereof between said positions upon response of said condition responsive means to different variations of a predetermined condition, an intermediate contact movable in alignment between said pair of contacts for engaging both thereof to close a circuit therebetween upon a predetermined movement of said one contact towards said other contact, and means for biasing said intermediate contact to maintain circuit closing engagement with said one contact during a predetermined movement of said one contact away from said other contact.

10. A control having in combination circuit control means including a pair of relatively movable contacts, condition responsive means including an actuating member operatively connected with one of said contacts for moving said one contact towards and away from the other of said contacts, an intermediate contact movable in alignment between said pair of contacts for engaging both thereof upon a predetermined movement of said one contact towards said other contact, means for biasing said intermediate contact to maintain said engagement with said one contact during a predetermined movement of said one contact away from said other contact, and means for adjusting the position of said one contact with respect to said actuating member, and stop means arranged selectively to actuate said adjusting means in response to different predetermined movements of said actuating member.

11. A stoker control device having in combination, a stoker hold fire control element movable toward and away from a predetermined stoker fire control position, operating means movable in response to a stoker fire condition, said operating means including a first member movable in response to variations in said condition and a second member adjustably mounted upon said first member and arranged for engagement with said control element, said members having a first predetermined relative positional relation for operating said control element to said predetermined control position when said stoker fire condition reaches a predetermined value and a second predetermined positional relation for operating said control element to said control position before said stoker fire condition reaches said value, means including a stop for selectively adjusting the positional relation of said members in accordance with variations in said stoker fire condition, and stoker out-fire control means actuable upon operation of said hold fire control element beyond said control position for rendering said element ineffective.

JOHN EATON.

REFERENCES CITED

The following references are of record in the file of this patent:

UNITED STATES PATENTS

| Number | Name | Date |
| --- | --- | --- |
| 1,607,392 | Denison | Nov. 16, 1926 |
| 2,162,296 | Chappell | June 13, 1939 |
| 2,175,945 | Simpson | Oct. 10, 1939 |
| 2,178,312 | Riche et al. | Oct. 31, 1939 |
| 2,209,298 | Martenis | July 23, 1940 |
| 2,367,985 | Weeks | Jan. 23, 1945 |